US 9,135,300 B1

(12) United States Patent
Yang et al.

(10) Patent No.: US 9,135,300 B1
(45) Date of Patent: Sep. 15, 2015

(54) EFFICIENT SAMPLING WITH REPLACEMENT

(71) Applicant: EMC Corporation, Hopkinton, MA (US)

(72) Inventors: Guangxin Yang, Beijing (CN); Yi Ren, Beijing (CN); Jianwang Ao, Beijing (CN); Caleb E. Welton, Foster City, CA (US)

(73) Assignee: EMC CORPORATION, Hopkinton, MA (US)

( * ) Notice: Subject to any disclaimer, the term of this patent is extended or adjusted under 35 U.S.C. 154(b) by 470 days.

(21) Appl. No.: 13/722,347

(22) Filed: Dec. 20, 2012

(51) Int. Cl.
G06F 17/30 (2006.01)
(52) U.S. Cl.
CPC .... *G06F 17/30442* (2013.01); *G06F 17/30445* (2013.01); *G06F 17/30536* (2013.01)
(58) Field of Classification Search
None
See application file for complete search history.

(56) References Cited

U.S. PATENT DOCUMENTS

| | | | | |
|---|---|---|---|---|
| 6,282,570 | B1 * | 8/2001 | Leung et al. | 709/224 |
| 6,865,567 | B1 * | 3/2005 | Oommen et al. | 1/1 |
| 6,889,221 | B1 * | 5/2005 | Luo et al. | 1/1 |
| 7,565,342 | B2 * | 7/2009 | Fuh et al. | 1/1 |
| 8,166,047 | B1 * | 4/2012 | Cohen et al. | 707/748 |
| 2002/0049759 | A1 * | 4/2002 | Christensen | 707/10 |
| 2002/0198863 | A1 * | 12/2002 | Anjur et al. | 707/1 |
| 2003/0145186 | A1 * | 7/2003 | Szendy et al. | 711/173 |
| 2004/0059743 | A1 * | 3/2004 | Burger | 707/101 |
| 2005/0285851 | A1 * | 12/2005 | Fossum et al. | 345/419 |
| 2007/0075994 | A1 * | 4/2007 | Fossum et al. | 345/419 |
| 2007/0258074 | A1 * | 11/2007 | Moest | 355/55 |
| 2008/0059540 | A1 * | 3/2008 | Brown et al. | 707/204 |
| 2009/0055361 | A1 * | 2/2009 | Birdwell et al. | 707/3 |
| 2010/0332210 | A1 * | 12/2010 | Birdwell et al. | 703/22 |
| 2011/0153554 | A1 * | 6/2011 | Cohen et al. | 707/607 |
| 2012/0278421 | A1 * | 11/2012 | Sun et al. | 709/208 |
| 2013/0282760 | A1 * | 10/2013 | Pendse et al. | 707/780 |

OTHER PUBLICATIONS

Olken, Random Sampling from Databases, 1993, retrieved May 28, 2015, retrieved from the Internet at: <URL: https://courses.cs.washington.edu/courses/cse590q/05au/papers/Olken-Sampling.pdf>.*

(Continued)

*Primary Examiner* — Neveen Abel Jalil
*Assistant Examiner* — Tyler Torgrimson
(74) *Attorney, Agent, or Firm* — John Gould; Theodore A. Chen; Krishnendu Gupta

(57) ABSTRACT

A method, article of manufacture, and apparatus for process data. In some embodiments, this includes determining a dataset, wherein the dataset includes a plurality of data values and a plurality of identifiers, and wherein the plurality of identifiers are in a non-continuous order, and wherein the dataset is stored across a number of segments, determining a number of samples to take from the dataset, identifying a minimum identifier and a maximum identifier, and a total number of identifiers, calculating a density based on the plurality of identifiers, minimum identifier and maximum identifier, calculating a number of samples to take from a segment based on the calculated density, the number of samples to take from the dataset, and the number of segments, generating a sub-dataset based on the calculated number of samples to take from a segment, joining the generated sub-dataset with the dataset, and storing the joined dataset in a storage device.

9 Claims, 4 Drawing Sheets

(56) References Cited

OTHER PUBLICATIONS

Lipton, Efficient sampling strategies for relational database operations, 1993, retrieved May 28, 2015, retrieved from the Internet at: <URL: http://www.sciencedirect.com/science/article/pii/030439759390224H#>.*

Gehrke, et al., BOAT—optimistic decision tree construction, 1999, retrieved May 28, 2015, retrieved from the Internet at: <URL: http://dl.acm.org/citation.cfm?id=304197?.*

* cited by examiner

```
1   SwR (D, m, k)
2   INPUT
3      D  the dataset to be sampled
4      m  the desired number of samples
5      k  the number of segments in a parallel database
6   OUTPUT
7      S  the SwR samples from D
8   BEGIN
9      SELECT max(id), min(id), count(id) FROM D INTO max, min, n;
10     density   = n / (max - min + 1);
11     q    = m / density / k;
12
13     CREATE TABLE aux {seg_id} AS
14        SELECT generate_series(1, k)
15        DISTRIBUTED BY (seg_id);
16
17     CREATE TABLE S AS
18        SELECT D.* FROM
19           (SELECT sample_within_range(q, max, min) AS id FROM aux) T
20           INNER JOIN
21           D
22        ON T.id = D.id
23        DISTRIBUTED BY (id);
24     RETURN S;
25  END
```

FIG. 1

| ID | Data Value |
|---|---|
| 0 | A |
| 1 | B |
| 3 | C |
| 4 | D |
| 6 | E |
| 7 | F |
| 9 | G |
| 10 | H |
| 14 | I |

FIG. 2

EFFICIENT SAMPLING WITH REPLACEMENT

CROSS REFERENCE TO RELATED APPLICATIONS

This application is related to co-pending U.S. patent application Ser. No. 13/722,425 for POLICY BASED OVER SAMPLING WITH REPLACEMENT and filed concurrently herewith, which is incorporated herein by reference for all purposes.

FIELD OF THE INVENTION

This invention relates generally to managing data, and more particularly to systems and methods for managing datasets in databases.

BACKGROUND OF THE INVENTION

With the large amounts of data generated in recent years, data mining and machine learning are playing an increasingly important role in today's computing environment. For example, businesses may utilize either data mining or machine learning to predict the behavior of users. This predicted behavior may then be used by businesses to determine which plan to proceed with, or how to grow the business.

Several algorithms have been created in these fields. One such algorithm is Random Forests. Such algorithms use multiple random points of data in order to make predictions. There are two methods to sample random data. The first method is sample with replacement (SwR), and the second is sample without replacement (SwoR).

Typically, SwR is the preferred method to sample random data since a selection will not affect the probability of subsequent selections. However, as datasets grow in size, some containing trillions of records, it is becoming increasingly difficult to generate an SwR sample that is sufficiently large and random for machine learning or data analytics purposes.

There is a need, therefore, for an improved method, article of manufacture, and apparatus for managing data.

BRIEF DESCRIPTION OF THE DRAWINGS

The present invention will be readily understood by the following detailed description in conjunction with the accompanying drawings, wherein like reference numerals designate like structural elements, and in which:

FIG. 1 illustrates an algorithm to take random samples in accordance with some embodiments.

FIG. 2 illustrates a sample dataset.

DETAILED DESCRIPTION

Figure 3:
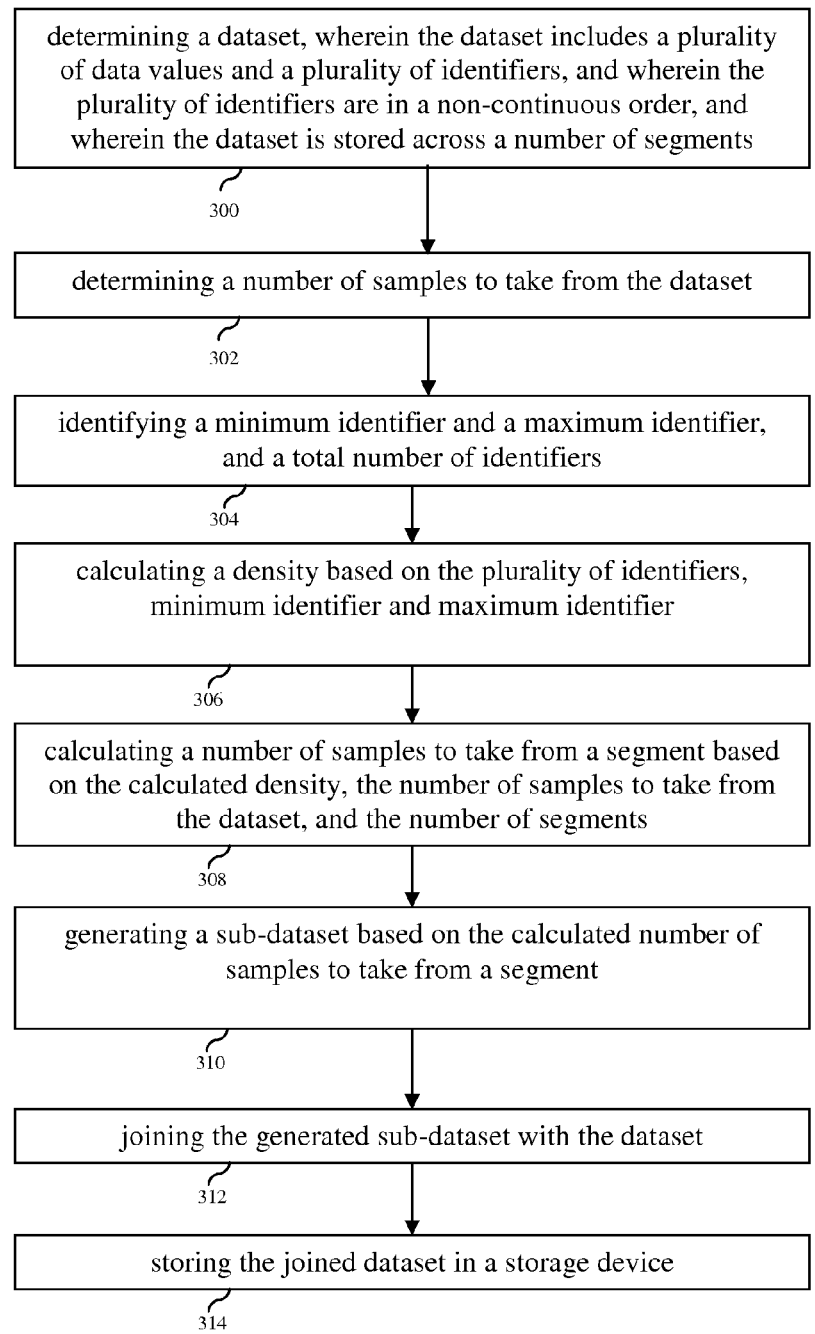
FIG. 3 is a flowchart of a method to process data in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 2:
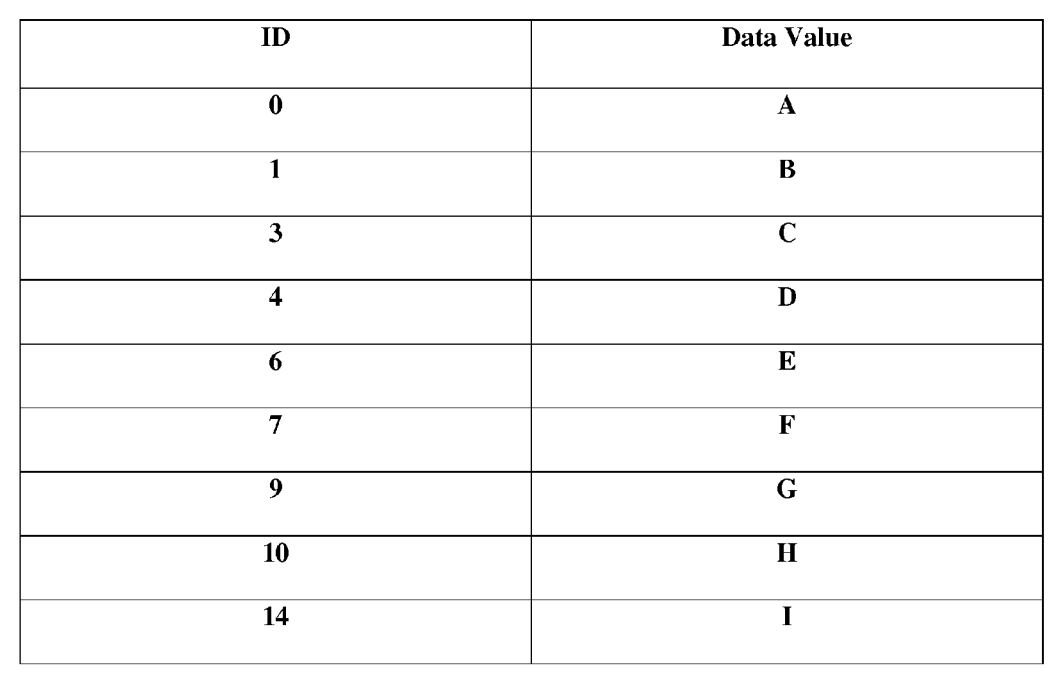

FIG. 1 illustrates an algorithm to take random samples in accordance with some embodiments. FIG. 2 is a sample dataset, which will be used to illustrate the application of the algorithm in FIG. 1. IDs in FIG. 2 are unique numeric identifiers, which identify the records in the database table. IDs are unique, but not necessarily continuous, as illustrated in FIG. 2. In some embodiments, it may be preferable to have non-continuous identifiers. For example, in distributed database systems, it is generally expensive and inefficient to maintain continuous identifiers.

With SwR, given a set $D=\{d_1, d_2, \ldots, d_n\}$, generates a multiset S, wherein $S=\{s|s \in D\}$, e.g. wherein s is an element of D. A typical way of creating S is to randomly choose a $d_{random}$ that belongs to D and add it to S. Another $d_{random}$ is then selected and added to S until S reaches a desired sample size.

In the above case, D is the table illustrated in FIG. 2. FIG. 2 is for illustrative purposes, but actual tables may include billions or trillions of entries. Further, the records may be distributed over a number of database segments, which may hold disjoint subsets of D. For example, IDs 0 and 1 may be in segment 1, while IDs 3 and 6 may be in segment 2, ID 4 may be in segment 3, IDs 7, 9, and 10 may be in segment 5, and ID 13 may be in segment 4. The database segments may be part of a shared-nothing parallel database, but the techniques described herein are equally applicable to centralized or distributed system. Further, though FIG. 2 illustrates a database table, D (e.g. the dataset) need not be limited to such a format.

As indicated in line 9 of FIG. 1, a minimum identifier (e.g. min), a maximum identifier (e.g. max), and a record count (e.g. n) are determined. Using FIG. 2 as D, the minimum identifier will be 0, the maximum identifier will be 14, and the record count will be 9. In other words, min=0, max=14, n=9. The identifier range (e.g. [min, max]), in this case, will be 0-14. Using these numbers, a density and q may be calculated, as indicated in lines 10 and 11 of FIG. 1.

Using the data from FIG. 2, density in this case is n/(max−min+1), or:

$$9/(14-0+1)=9/15=0.6$$

Similarly, using the data from FIG. 2, q in this case is m/density/k, or:

$$m/0.6/k$$

q is the number of samples, or identifiers in this case, that each segment will produce, m is the desired total number of samples, and k is the number of segments in the database as defined in line 5 of FIG. 1. In non-parallel databases, k=1, so q would be the number of samples that the whole database produces. It should be noted that with "gaps" in the identifiers, or non-continuous identifiers, density is always less than 1 since max is always greater than (n−1+min).

With the equation above, q will sometimes be a non-integer. In some embodiments, q may be rounded up to the next integer. In some embodiments, q may be rounded down to the next integer. Depending on user preference and the amount of data involved, either rounding up or down may be acceptable. For example, in a big data environment, a user may request one million random samples to be used in Random Forests. In this case, a result of 999,999 samples or 1,000,001 samples may be within an acceptable margin of error, and the output of Random Forests may not be significantly different. In some embodiments in which more data is sampled than requested, the extra sampled data may be discarded.

In line 19 of FIG. 1, each segment will produce q identifiers randomly and uniformly distributed within [min, max] (e.g. [0, 14]) with the sample_within_range function. Each segment executes sample_within_range independently. If the segments use the same kind of random number generator, the segments have to use different seeds. For simplicity, T is used to represent the set of identifiers produced by all the segments.

The total number of identifiers generated (e.g. the size of T) is k (the number of segments) multiplied by q (the number of identifiers generated by each segment). Since q=m/density/k, then k*q=m/density. In other words, the total number of identifiers generated is m/density. T can then be joined with D to extract the SwR samples from D. Further, as each identifier in T is generated independently out of [min, max], each data value of the SwR samples is derived independently out of D. The resulting SwR samples of D may be stored in another table, database, or other form of data. The resulting form of data may, in some embodiments, be dictated by the requirements of a machine learning algorithm (e.g. Random Forests, etc.), or other IT-related policies.

In some embodiments, the output of the techniques described herein (e.g. T joined with D), may be used as input to generate decision trees, as described in co-pending application Ser. Nos. 13/722,847, 13/722,780, 13/722,747, and 13/722,864, and filed concurrently herewith, which are incorporated herein by reference for all purposes.

Since T only contains identifiers, as opposed to the data value, which may be much larger, significant resources savings may be realized. Further, when implemented in a database environment, the techniques described herein involve only two major disk operations: a sequential scan to determine min, max, and n, and a hash join to generate the SwR samples. In some embodiments, the sequential scan may be skipped if the min, max, and n are stored in metadata or some other format. For example, some databases routinely collect and keep those statistics. In such cases, line 9 may be coded to read in those variables from the database (or metadata) instead of scanning the database to determine those values.

Furthermore, since T only contains identifiers, the overhead is minimized. All database instances (e.g. all k segments), may have approximately the same workload even if the dataset is distributed unevenly over the k segments. For example, suppose a database has three segments, with the first segment having 10% of the dataset, the second segment having another 10% of the dataset, and the third segment having 80% of the dataset. Since T does not have the actual data, sampling q samples from each of the segments will be spread evenly across the three segments, even if the majority of the dataset is in the third segment.

Since each identifier in T is generated independently out of [min, max], for each identifier in T, the probability of having a corresponding number in D is roughly equal to density, which is an accurate enough estimation for big data targeted by this invention. Since T has roughly m/density identifiers, the size of the result of the inner join between T and D is likely to be m/density*density, which is m.

In some embodiments, as illustrated at lines 13-15 of FIG. 1, an auxiliary table named aux with k records is created so that calls to sample_within_range are parallelized and distributed to all segments.

FIG. 3 illustrates a method to process data in accordance with some embodiments. In step 300, a dataset is determined, wherein the dataset includes a plurality of data values and a plurality of identifiers, and wherein the plurality of identifiers are in a non-continuous order, and wherein the dataset is stored across a number of segments. In step 302, a number of samples to take from the dataset is determined. In step 304, a minimum identifier and a maximum identifier, and a total number of identifiers are identified. In step 306, a density based on the plurality of identifiers, minimum identifier and maximum identifier is calculated. In step 308, a number of samples to take from a segment based on the calculated density, the number of samples to take from the dataset, and the number of segments is calculated. In step 310, a sub-dataset based on the calculated number of samples to take from a segment is generated. In step 312, the generated sub-dataset is joined with the dataset. In step 314, the joined dataset in a stored in a storage device.

In some embodiments, the sample size may not be precisely equal to m. In such cases, an over-sample may be performed (e.g. use a higher value m in the algorithm in FIG. 1). Once the over sample has been performed, the resulting higher sample size may be compared against the requested m, and a difference may be taken. In some embodiments, lines 18-22 may be repeatedly performed until at least m samples have been obtained, and the rest may be discarded.

The decision to over sample, and by how much to over sample, may be based on policy. For example, a policy may dictate that any "m" entered by a user may automatically be increased by 5% before being applied by the algorithm in FIG. 1. Along the same lines, a policy may dictate that the function in lines 18-22 of FIG. 1 be repeated until the resulting samples is 105% of the "m" requested by the user (e.g. a 5% increase over the "m" entered by the user).

Figure 4:
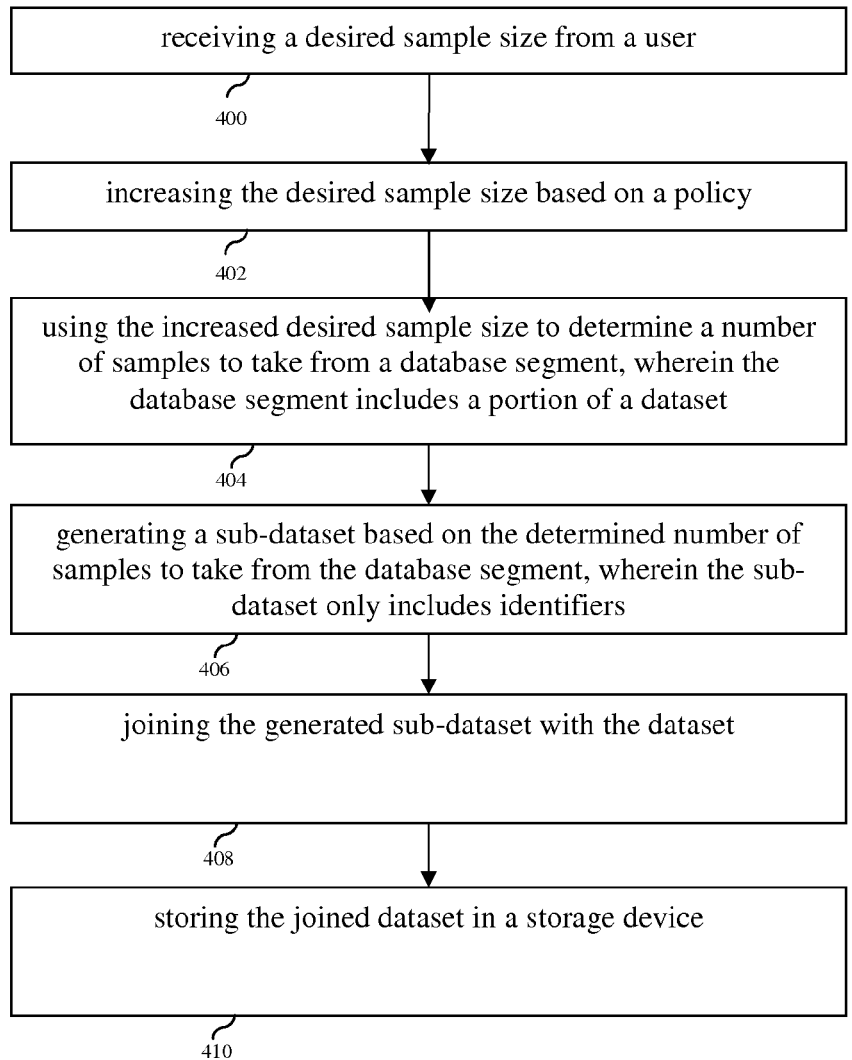
FIG. 4 is a flowchart of a method to process data in accordance with some embodiments.

FIG. 4 illustrates a method to process data in accordance with some embodiments. In step 400, a desired sample size is received from a user. In step 402, the desired sample size is increased based on a policy. In step 404, the increased desired sample size is used to determine a number of samples to take from a database segment, wherein the database segment includes a portion of a dataset. In step 406, a sub-dataset is generated based on the determined number of samples to take from the database segment, wherein the sub-dataset only includes identifiers. In step 408, the generated sub-dataset is joined with the dataset. In step 410, the joined dataset is stored in a storage device.

For the sake of clarity, the processes and methods herein have been illustrated with a specific flow, but it should be understood that other sequences may be possible and that some may be performed in parallel, without departing from the spirit of the invention. Further, though the techniques herein teach creating one SwR sample in parallel, those with ordinary skill in the art will readily appreciate that the techniques are easily extendable to generate many SwR samples. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for processing data the method comprising:
   determining a dataset, wherein the dataset includes a plurality of data values and a plurality of identifiers, and wherein the plurality of identifiers are in a non-continuous order, and wherein the dataset is stored across a plurality of segments in a shared nothing distributed database;
   determining a number of samples to take from the dataset;
   identifying a minimum identifier and a maximum identifier, and a total number of identifiers;
   calculating a density based on the total number of identifiers, minimum identifier and maximum identifier;
   calculating a number of samples to take from each of the plurality of segments based on the calculated density, the number of samples to take from the dataset, the number of segments, and a sampling policy;
   each segment of the plurality of segments independently and randomly sampling identifiers of the dataset within its segment using the calculated number of samples to take from its respective portion of the dataset to generate a sub-dataset;
   joining the generated sub-datasets of the plurality of segments with the dataset;
   storing the joined dataset in a storage device; and
   generating one or more decision trees using the joined dataset.

2. The method as recited in claim 1, further comprising using the joined dataset in a machine language algorithm.

3. The method as recited in claim 1, wherein the maximum identifier, the minimum identifier, and the total number of identifiers are stored as metadata in a database.

4. A system for processing data, comprising a storage device and a processor configured to:
   determine a dataset, wherein the dataset includes a plurality of data values and a plurality of identifiers, and wherein the plurality of identifiers are in a non-continuous order, and wherein the dataset is stored across a plurality of segments in a shared nothing distributed database;
   determine a number of samples to take from the dataset;
   identify a minimum identifier and a maximum identifier, and a total number of identifiers;
   calculate a density based on the total number of identifiers, minimum identifier and maximum identifier;
   calculate a number of samples to take from each of the plurality of segments based on the calculated density, the number of samples to take from the dataset, the number of segments, and a sampling policy;
   each segment of the plurality of segments independently and randomly sample identifiers of the dataset within its segment using the calculated number of samples to take from its respective portion of the dataset to generate a sub-dataset;
   join the generated sub-datasets of the plurality of segments with the dataset;
   store the joined dataset in the storage device; and
   generate one or more decision trees using the joined dataset.

5. The system as recited in claim 4, the processor further configured to use the joined dataset in a machine language algorithm.

6. The system as recited in claim 4, wherein the maximum identifier, the minimum identifier, and the total number of identifiers are stored as metadata in a database.

7. A computer program product for processing data, comprising a non-transitory computer readable medium having program instructions embodied therein for:
   determining a dataset, wherein the dataset includes a plurality of data values and a plurality of identifiers, and wherein the plurality of identifiers are in a non-continuous order, and wherein the dataset is stored across a plurality of segments in a shared nothing distributed database;
   determining a number of samples to take from the dataset;
   identifying a minimum identifier and a maximum identifier, and a total number of identifiers;
   calculating a density based on the total number of identifiers, minimum identifier and maximum identifier;
   calculating a number of samples to take from each of the plurality of segments based on the calculated density, the number of samples to take from the dataset, the number of segments, and a sampling policy;
   each segment of the plurality of segments independently and randomly sampling identifiers of the dataset within its segment using the calculated number of samples to take from its respective portion of the dataset to generate a sub-dataset;
   joining the generated sub-datasets of the plurality of segments with the dataset;
   storing the joined dataset in a storage device; and
   generating one or more decision trees using the joined dataset.

8. The computer program product as recited in claim 7, further comprising program instructions for using the joined dataset in a machine language algorithm.

9. The computer program product as recited in claim 7, wherein the maximum identifier, the minimum identifier, and the total number of identifiers are stored as metadata in a database.

* * * * *